United States Patent [19]
Tandberg et al.

[11] Patent Number: 4,910,827
[45] Date of Patent: Mar. 27, 1990

[54] BARBECUE GRILL WITH CLEANING BAR

[76] Inventors: William E. Tandberg, 11516 Loch Lomond, Whittier, Calif. 90606; Leonard G. Tandberg, 4427 Mistral Pl., San Diego, Calif. 92130

[21] Appl. No.: 309,875

[22] Filed: Feb. 14, 1989

[51] Int. Cl.$^4$ .............................................. B08B 1/00
[52] U.S. Cl. ............................... 15/236.06; 15/236.09
[58] Field of Search ........... 15/236.07, 236.09, 236.01; 99/450; 126/25 R

[56] References Cited
U.S. PATENT DOCUMENTS

| | | | |
|---|---|---|---|
| 2,747,911 | 5/1956 | Kuever | 15/236.07 |
| 2,824,323 | 2/1958 | Tos et al. | 15/236.07 X |
| 2,920,614 | 1/1960 | Phelps | 126/25 R |
| 3,366,987 | 2/1968 | Giustino | 15/236.08 X |
| 3,434,175 | 3/1969 | Bray | 15/236.08 X |
| 4,112,537 | 9/1978 | Hewck | 15/236.07 |
| 4,434,780 | 3/1984 | Hepner | 126/25 R |
| 4,668,302 | 5/1987 | Kolodziej et al. | 15/236.08 X |

Primary Examiner—Chris K. Moore
Attorney, Agent, or Firm—Edgar W. Averill, Jr.

[57] ABSTRACT

An easy to clean barbecue grill of the type which has a plurality of parallel rods. A cleaning bar surrounds the rods and has holes that are just slightly larger than the rods. The barbecue rods may be simply cleaned by moving the bar from one end of the grill to the other end.

14 Claims, 2 Drawing Sheets

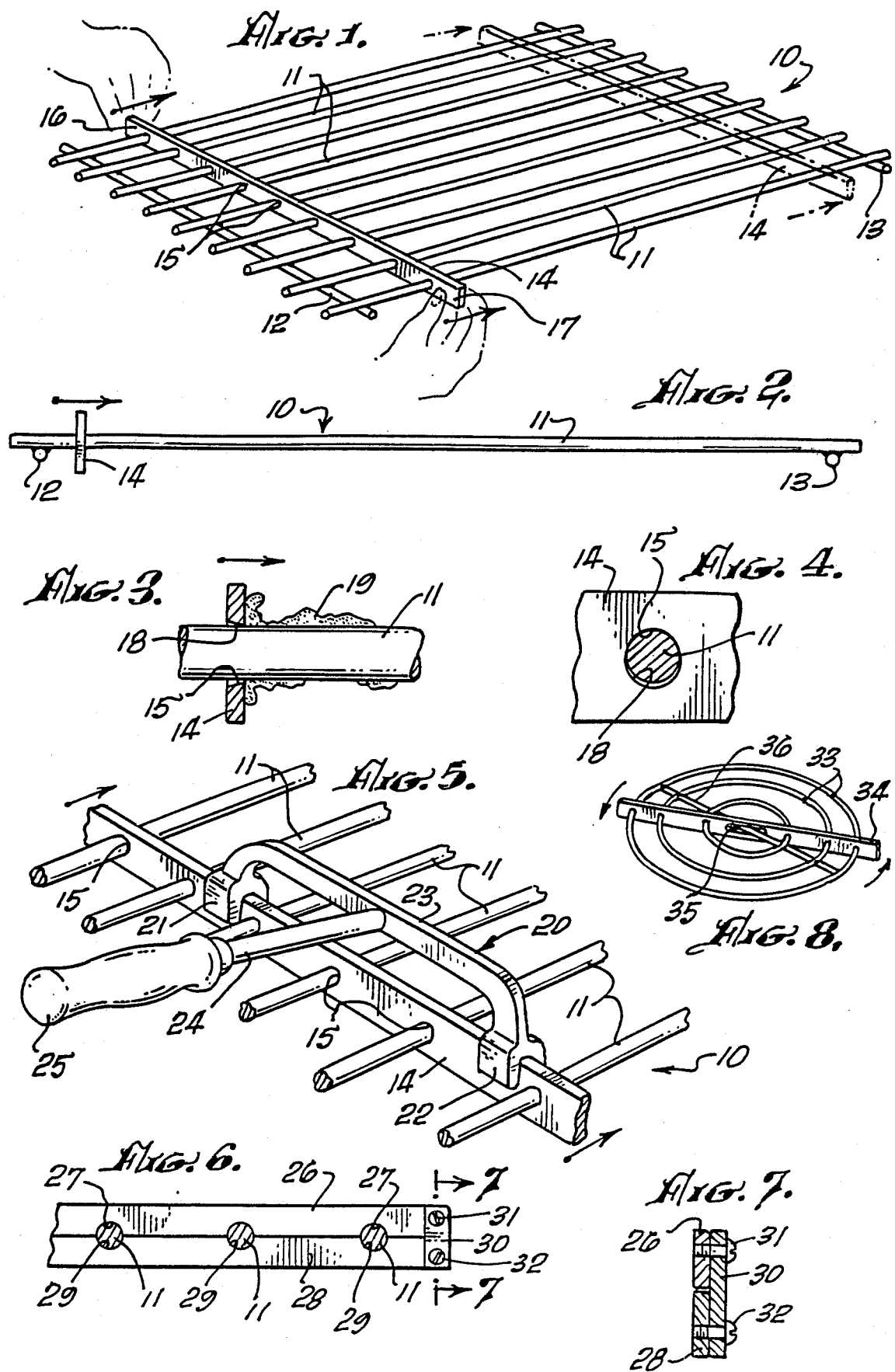

BARBECUE GRILL WITH CLEANING BAR

BACKGROUND OF THE DISCLOSURE

The field of the invention is cooking equipment, and the invention relates more particularly to barbecues.

Outdoor barbecue grills are becoming more popular worldwide. Such grills are typically heated either by charcoal briquettes or by propane gas. Such grills may also be placed indoors with appropriate ventilation.

A major difficulty of the typical outdoor barbecue is that of cleaning the grill. If this job is neglected, articles of burned food will detract from the taste of the barbecue-cooked food. The most common method for cleaning a barbecue grill is, perhaps, the wire brush. The wire brush, however, cleans only the top and sides and the process is, furthermore, a time-consuming task which often splatters the person cleaning the grill with blackened grease.

An improved barbecue scraper is disclosed in U.S. Pat. No. 4,668,302, but such scraper is time-consuming to use and inefficient in cleaning the underside of the barbecue grill rods.

SUMMARY OF THE INVENTION

It is an object of the present invention to provide an easy to clean barbecue grill which cleans not only the top and sides of the barbecue rods, but also cleans the bottom thereof.

The present invention is for an easy to clean barbecue grill of the type which has a plurality of parallel rods. The grill has first and second end rods and a plurality of parallel rods affixed to the end rods. A cleaning bar, comprising a bar with a plurality of openings corresponding to the plurality of parallel rods, is positioned between the first and second ends and may be moved from the first end to the second end, and the bar scrapes burned matter from all sides of each rod. The bar may either be a unitary bar or a pair of half bars with semicircular openings which are joined to form a unitary bar. The bar may either be moved by hand when the grill is cool or by an affixable handle which may be used either when the grill is cool or when it is hot.

BRIEF DESCRIPTION OF THE DRAWINGS

FIG. 1 is a perspective view showing the easy to clean barbecue grill of the present invention.

FIG. 2 is a side view thereof.

FIG. 3 is an enlarged cross-sectional view showing the cleaning bar of the grill of FIG. 1 and one of the plurality of parallel rods thereof.

FIG. 4 is an enlarged cross-sectional view showing one of the parallel rods with and a portion of the cleaning bar surrounding the rod.

FIG. 5 is an enlarged, perspective view showing the cleaning bar and a plurality of parallel rods together with a separate handle for moving the cleaning bar from one end of the grill to the other end.

FIG. 6 is a cross-sectional view of an alternate embodiment of the cleaning bar of the grill of FIG. 1.

FIG. 7 is a cross-sectional view taken along line 7—7 of FIG. 6.

FIG. 8 is a perspective view of an alternate embodiment of the easy to clean barbecue grill of FIG. 1.

DESCRIPTION OF THE PREFERRED EMBODIMENTS

Figure 9:
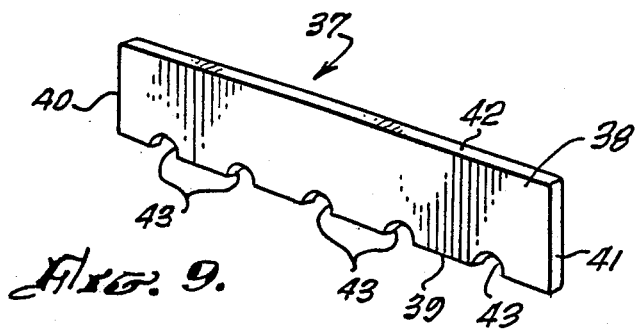
FIG. 9 is a perspective view of a barbecue grill cleaning bar of the present invention.

The easy to clean barbecue grill of the present invention is shown in perspective view in FIG. 1 and indicated by reference character 10. Grill 10 has a plurality of parallel rods 11 and a first end rod 12 and a second end rod 13. A cleaning bar 14 has a plurality of openings 15 which surround the parallel rods 11. Cleaning bar 14 is placed over the rods 11 before the second end rod 13 is welded in place.

Cleaning bar 14 may extend past the outermost rods, as indicated at reference characters 16 and 17, so that the user may grasp cleaning bar 14 at both ends and move it from a position adjacent first end rod 12 to a position adjacent second end rod 13 and then move it back again. It would, of course, be possible to clean the rods 11 simply by a movement from the first end to the second end, but a second movement is preferred to further remove any burned matter from rods 11.

Cleaning bar 14, of course, normally remains in place as the grill is used. It is made from stainless steel or other heat resistant and corrosion resistant material so that it will last for the life of the grill.

Grill 10 is shown in side view in FIG. 2 where the cleaning bar 14 is shown in end view.

Although the openings 15 may be cylindrical, a cleaning bar with a reduced tendency to bind is formed by the use of frustro-conical openings such as frustro-conical opening 18 shown in FIG. 3. It can be seen that the charred residue 19 on rod 11 is easily removed by the movement of cleaning bar 14. It is significant that the bar not only cleans the top, but also cleans an area rarely cleaned by conventional grill cleaning methods, that is the bottom, since the openings in bar 14 completely surround rod 11.

As indicated in FIG. 4, openings 15 should be slightly larger than the outside diameter of rod 11 so that the bar will not bind as it is moved in a cleaning operation. A handle is shown in FIG. 5 and indicated generally by reference character 20. Handle 20 has a pair of U-shaped extensions 21 and 22 which may be placed over the top of cleaning bar 14. The U-shaped extensions 21 and 22 are welded, or otherwise affixed, to a bar 23 to which a handle rod 24 is welded. An insulative handle 25 permits the use of handle 20 even when the grill is still hot.

In order to enable the cleaning bar to be used on existing grills, a two-piece version is shown in FIG. 6. An upper half 26 has a plurality of semicircular openings 27. Similarly, a lower half 28 has a matching series of semicircular openings 29. A small bar 30 is held to the upper and lower halves by a pair of screws 31 and 32. Of course, alternate methods may be used to join the two half bars.

As shown in FIG. 8, the grill need not have straight rods, but may be formed from circular rods, such as shown in FIG. 8, where the circular rods ar indicated by reference character 33. The cleaning bar 34 has a slot 35 which surrounds an end rod 36 which is welded to each of the circular rods 33. The circular grill is cleaned by rotating the bar around the grill or the grill around the bar.

An alternate embodiment of a barbecue cleaning device is shown in FIG. 9 where a barbecue grill cleaning bar is indicated by reference character 37. Bar 37 is fabricated from a generally rectangular bar 38 which has a bottom 39, two ends 40 and 41 and a top 42. Five semi-circular notches 43 are shown in the bottom 39 of bar 38. These are shaped to surround approximately 180° of a barbecue rod as shown best in FIG. 11. The use of cleaning bar 37 greatly facilitates the cleaning of a barbecue grill in that a multiple number of bars can be cleaned at the same time, and the upper 180° is scraped cleaned by a single pass of bar 37.

Figure 10:
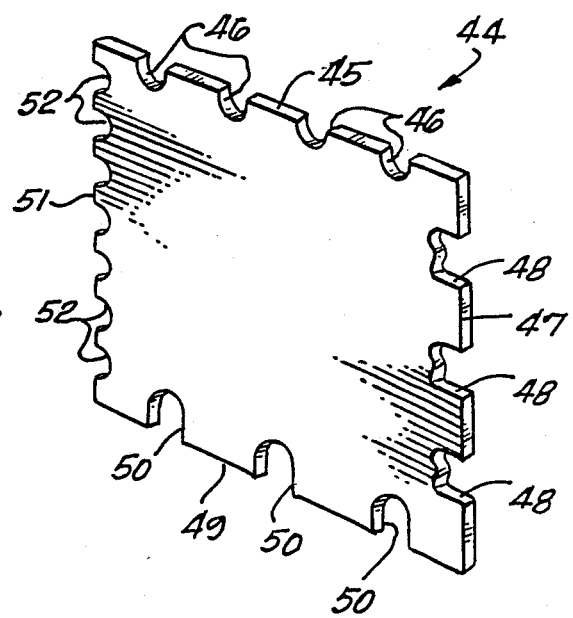
FIG. 10 is a perspective view of an alternate embodiment of the barbecue grill cleaning bar of FIG. 9.

A multi-functional cleaning square 44 is shown in perspective view in FIG. 10. Square 44 has a top 45 with four notches 46, a side 47 which has three notches 48, a bottom 49 with three notches 50 and a side 51 with a plurality of small notches 52. Note that notches 48 are not semi-circular but, instead, are irregularly shaped to clean a cast iron grill. Cleaning bar 37, or cleaning square 44, may either be hand held or may be provided with a permanent or removable handle.

Figure 11:
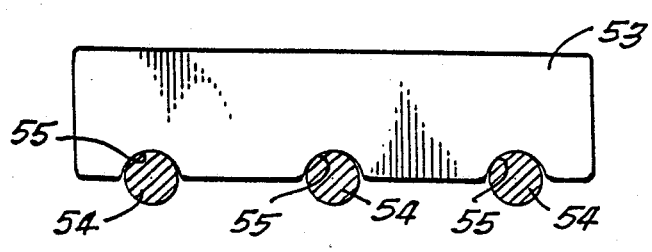
FIG. 11 is a side view of an alternate embodiment of the barbecue grill cleaning bar of FIG. 9 positioned over three barbecue grill bars shown in cross-section.

A cleaning bar 53 is shown in side view in FIG. 11 positioned over three barbecue rods 54. Three semi-circular notches 55 clean approximately 180° of rods 54 and, likewise, may be either held in the user's hand or provided with a permanent or removable handle.

Although the grill rods are shown as having a circular cross-section, they could, of course, be in the shape of any polygon. Also, the bar is not limited to cleaning barbecue grills, but may be used on other grates having rods in a single plane.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An easy to clean barbecue grill of the type which has a preselected number of parallel rods, said grill comprising:
   a first end rod;
   a preselected number of parallel rods, each of said parallel rods having a first end and a second end, said preselected number of parallel rods being affixed to said first end rod near a first end of said preselected number of parallel rods, all of said preselected number of rods being in a common plane;
   a second end rod affixed to said preselected number of rods near the second end of said preselected number of parallel rods; and
   a cleaning bar comprising a bar with a plurality of openings, each one of said plurality of openings surrounding a corresponding to one of said preselected number of parallel rods, said bar being positioned between said first end rod and said second end rod, said openings being slightly larger than the rods of said preselected number of rods and surrounding each of said rods, whereby said cleaning bar cleans all of said preselected number of rods as it is moved from near the first end rod to near said second end rod.

2. The easy to clean barbecue grill of claim 1 wherein said cleaning bar is a unitary bar with a plurality of aligned holes therethrough.

3. The easy to clean barbecue grill of claim 2 wherein said preselected number of rods are equal in length and said barbecue grill is generally rectangular and wherein said cleaning bar extends past the outermost of said plurality of rods at both ends of said cleaning bar, whereby the ends of said cleaning bar may be grasped at the ends thereof and moved from its position adjacent one end rod to a position adjacent the other end rod.

4. The easy to clean barbecue grill of claim 1 wherein said openings are frusto-conical in shape.

5. The easy to clean barbecue grill of claim 1 wherein said cleaning bar is made from two identical half bars affixed together.

6. The easy to clean barbecue grill of claim 5 wherein the two-half bars are affixed together at the ends thereof.

7. The easy to clean barbecue grill of claim 1 further including a handle member, said handle member having a cleaning bar end with at least one generally U-shaped member thereon for attaching to the cleaning bar and a handle end with a handle thereon whereby the cleaning bar may be moved by affixing the handle member to the cleaning bar and moving said bar from near the first end of the preselected number of rods to near the second end of the rods while the grill is hot.

8. The easy to clean barbecue grill of claim 7 wherein there are two of said generally U-shaped members.

9. An easy to clean barbecue grill including means to clean all sides of the rods of the grill, said grill comprising:
   a preselected number of parallel grill rods having at least one end rod to which the grill rods are affixed;
   said means to clean comprising a cleaning bar having a plurality of holes therethrough, each hole surrounding a corresponding one of said preselected number grill rods, said holes being slightly larger than the grill rods, whereby the movement of the cleaning bar along the grill rods cleans all sides of the grill rods.

10. The easy to clean barbecue grill of claim 9 wherein said grill rods are circular.

11. The easy to clean barbecue grill of claim 9 wherein said grill rods are straight and there are two of said end rods.

12. The easy to clean barbecue grill of claim 9 wherein said holes are frusto-conical in shape.

13. The easy to clean barbecue grill of claim 9 wherein said cleaning bar is a unitary bar.

14. The easy to clean barbecue grill of claim 9 wherein said cleaning bar is made from an upper length having a plurality of semicircular openings and a lower length having a plurality of semicircular openings, said semicircular openings forming generally circular openings when the upper length and lower length are joined together, and the generally circular openings are slightly larger than the plurality of parallel grill rods.

* * * * *